United States Patent [19]

Yano

[11] Patent Number: 5,107,126
[45] Date of Patent: Apr. 21, 1992

[54] FAR INFRARED GENERATOR

[76] Inventor: Shusuke Yano, 2191, Shioya, Akou-shi, Hyogo, 678-02, Japan

[21] Appl. No.: 630,739
[22] PCT Filed: Aug. 20, 1988
[86] PCT No.: PCT/JP88/00829
§ 371 Date: Apr. 21, 1989
§ 102(e) Date: Apr. 21, 1989
[87] PCT Pub. No.: WO89/02208
PCT Pub. Date: Mar. 9, 1989

Related U.S. Application Data

[63] Continuation of Ser. No. 347,895, Apr. 21, 1989, abandoned.

[30] Foreign Application Priority Data

Aug. 22, 1987 [JP] Japan .................. 62-208807
Sep. 24, 1987 [JP] Japan .................. 62-240315

[51] Int. Cl.$^5$ .............................................. H05B 6/80
[52] U.S. Cl. .................... 250/493.1; 219/10.55 R; 219/10.55 B; 219/10.55 E; 219/10.55 F
[58] Field of Search .............. 250/493.1; 219/10.55 R, 219/10.55 E, 10.55 B, 10.55 F

[56] References Cited

U.S. PATENT DOCUMENTS

| | | | |
|---|---|---|---|
| 3,783,220 | 1/1974 | Tanizaki | 219/543 |
| 4,329,557 | 5/1982 | Staats | 219/10.55 E |
| 4,367,388 | 1/1983 | Ishibara et al. | 219/10.55 E |
| 4,702,262 | 10/1988 | Andersen et al. | 219/10.55 E |
| 4,741,348 | 5/1988 | Kikuchi et al. | 219/10.55 R |
| 4,803,324 | 2/1989 | Fujii et al. | 219/10.55 E |
| 4,804,812 | 2/1989 | Tanaka et al. | 219/10.55 B |
| 4,816,632 | 3/1989 | Claesson et al. | 219/10.55 E |
| 4,816,986 | 3/1989 | Spiridonov et al. | 219/10.55 B |

FOREIGN PATENT DOCUMENTS

| | | | |
|---|---|---|---|
| 1231829 | 1/1962 | Fed. Rep. of Germany | 219/10.55 |
| 50-157534 | 6/1974 | Japan . | |
| 62-29089 | 7/1985 | Japan . | |
| 62-132303 | 2/1986 | Japan . | |

Primary Examiner—Jack I. Berman
Assistant Examiner—Kiet T. Nguyen
Attorney, Agent, or Firm—Burns, Doane, Swecker & Mathis

[57] ABSTRACT

A far infrared generator comprising a microwave generating unit and an energy converter for converting microwave energy from the output portion of the microwave generating unit into far infrared rays. The energy converter consists essentially of a magnesium oxide or other dielectric material, and it converts irradiated microwaves into far infrared rays therein, in turn radiating far infrared rays. Although the wave length of this far infrared ray varies with the type and temperature of the dielectric, it covers the range of near infrared to far infrared ray wave lengths; therefore, the far infrared generator can be used as a heat source for cooking appliances and other articles. For this purpose, the energy converter may be provided with a controlling unit for controlling its temperature to regulate the wave length of the far infrared rays.

11 Claims, 3 Drawing Sheets

FAR INFRARED GENERATOR

DESCRIPTION

This application is a continuation of application Ser. No. 347,895, filed Apr. 21, 1989, now abandoned.

1. Technical Field

The present invention relates to a far infrared generator and, more particularly, to a far infrared generator which radiates far infrared rays by conversion of microwave energy into far infrared energy.

2. Background Art

In recent years, infrared radiation, especially, infrared rays with wave lengths ranging from near infrared to far infrared region have received much attention because of its energy-saving and mild warming effects, and far infrared radiation has now commercially utilized as a heat source for heating, drying, and other purposes in various industrial fields such as industries of machines, metals, automobiles, plastics, electric or electronic devices, lumbers, architecture and foods.

Conventionally, as a means of generating far infrared rays, there have been used those utilizing electric resistance heating (e.g. far infrared lamps, electric heaters) or those utilizing secondary heating with a separate heat source (e.g. sheathed heaters, radiant burners). Such conventional far infrared generating means generally produces far infrared radiation by heating an infrared radiating ceramic material such as $ZrO_2$, $ZrO_2 \cdot SiO_2$, $Fe_2O_3$, or the like.

However, these far infrared generating means must be maintained at temperatures of several hundred degrees Centigrade and above as they utilize far infrared rays caused by thermal radiation. In addition, it is difficult to obtain desired far infrared radiation since the wave length and emissivity of the far infrared rays vary widely with the temperature and condition of the surface of the radiator. They also have such a drawback that the use of thermal radiation leads to increase in apparatus size, thus making it difficult to use these conventional means as a heat source of household appliances.

DISCLOSURE OF INVENTION

It is, therefore, an object of the present invention to provide a compact far infrared generator capable of efficiently generating far infrared rays with a desired wave length with a simple structure.

Another object of the present invention is to provide a far infrared generator which can be used in cheap and compact cookers.

According to the present invention, there is provided a far infrared generator comprising a means for generating microwaves and an energy converter placed in front of the microwave output portion of the microwave generating means and consists of a dielectric which converts microwave energy emitted from the microwave generating means into far infrared radiation.

It is preferred that the far infrared generator is provided with a means for controlling temperature of the energy converter to ensure control of wave lengths of radiated far infrared rays.

Dielectric materials for constituting the energy converter include ferro electrics, pyroelectrics and piezoelectric material. Oxides, fluorides and complex oxides of at least one metal selected from the group consisting of magnesium, calcium, zirconium, silicon, aluminum and titanium are typical dielectrics. But these are not to be construed as limitations. These dielectrics can be used in any form such as single crystal, polycrystal, or ceramics. The single crystal includes natural single crystals such as rock crystal, sapphire and ruby, as well as artificial crystals.

It is preferred to use a dielectric material containing a very small amount of one or more transition metals. Here, of atomic numbers 21 (Sc) to transition metals mean elements of atomic numbers 21 (Sc) to 30 (Zn), 39 (Y) to 48 (Cd), 57 (La) to 80 (Hg), and 89 (Ac) and above. These elements may be contained singly or in combination of two or more.

The above-mentioned complex oxides include:

(a) aluminosilicates containing alkali metals, e.g. muscovite-series micas and biotite-series micas, represented by the general formula:

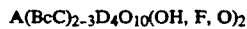

wherein A represents K, Na, or Li; B and C independently represent FeII, FeIII, Mn, Al, Mg, or V; D represents Si or Al;

(b) Single or multicomponent dielectric ceramics with a perovskite structure represented by the general formula:

wherein A′ represents at least one of Ba, Sr, Mg, Pb, Ca, K, and Na; B′ represents Zr, Ti, or Nb; or modified ceramics containing a lanthanide element or other impurities incorporated therein; for example, known dielectric ceramics such as, for example, pure or modified lead titanate ceramics, pure or modified barium titanate ceramics, pure or modified lead zirconate ceramics, and pure or modified lead titanate zirconate ceramics; high dielectric ceramics; piezoelectric ceramics; and ferro electric ceramics; and (c) ceramics comprising at least two components selected from the group consisting of MgO, $Al_2O_3$, and $SiO_2$, such as, for example, steatite, forsterite, cordierite ceramics ($2MgO—2Al_2O_3—5SiO_2$), mullite ceramics ($3Al_2O_3—2SiO_2$), and spinel ceramics. Note that these examples are not to be construed as limitations.

The above-mentioned energy converter may be made of a definite-form dielectric, such as a single crystal, ceramics and the like, or of a dielectric layer formed on a substrate of an electromagnetic wave transmitting material. In the latter case, the dielectric layer can be formed on the surface of the substrate with a known thin film forming technique such as vapor deposition, sputtering, thermal spraying, or printing. As a material for the substrate, it is Preferred to use electromagnetic wave transmitting materials, such as glass and ceramics.

The energy converter can take any form, i.e., it may be platy, domy, cylindrical, prismatic, etc. However, it is, preferred to prepare the energy converter in such a form as it surrounds the output portion of the microwave generating means to ensure the prevention of microwave leakage and the improvement of conversion efficiency.

As a microwave generating means, it is preferred to use microwave oscillators comprising a microwave tube such as magnetron, platinotron or klystron. Although it is possible to select any frequency for the microwave oscillator, it is preferred, from the viewpoint of cost performance, to use a microwave tube on the market and operate it at the free radiation frequency that does not cause receiving interference on broadcasting, radiocommunication, and other equipment (2450 MHz in Japan, 915 MHz in the United States). In addition, the output power of microwave tubes with 2450 MHz frequency ranges from 400 W to 5 kW; it is preferred to use a microwave tube having an output power of not less than 500 W.

As a temperature controlling means, there may be used any of the conventionally known heating or cooling devices such as, for example, electric heaters attached to the energy converter to directly heat it, circulating heaters or coolers which supply the piping attached to the energy converter with a heat transfer medium to heat or cool the energy converter, heating or cooling system for supplying heated or cooled air or other gas to over the energy converter, and thermal devices based on the Peltier effect.

In operating the microwave generating means, the microwaves are radiated from the output portion of the microwave generating means and then converted into far infrared rays by the dielectric when passing through the energy converter, whereby far infrared rays are radiated. The wave length of the far infrared rays thus radiated varies with the oscillatory frequency of the microwave tube and the material and temperature of the dielectric constituting the energy converter. For example, when using a magnetron as the microwave tube in combination with a single crystal of magnesium oxide as the dielectric, infrared rays with 0.8 to 40 $\mu$m wave lengths, particularly those with relatively long wave lengths, i.e. 2 to 20 $\mu$m, are generated at normal temperature. Therefore, the use of the far infrared generator of the present invention as an energy source for heating purposes, e.g. in place of a magnetron in microwave ranges, permits far infrared radiation heating instead of microwave heating.

On the other hand, the radiation of near-infrared rays with shorter wave lengths increases as the energy converter temperature increases, while far infrared rays with longer wave lengths are radiated when the energy converter temperature decreases. For example, when using a magnetron as the microwave tube in combination with a single crystal of magnesium oxide as the dielectric for the energy converter, most of the resulting infrared radiation has the wave length longer than 8 $\mu$m at a temperature ranging from normal temperature to 40° C. However, when the temperature rises to 100°, 200°, and 400° C., the limit of the short wave length decreases gradually to 6, 5, and 4$\mu$, respectively, resulting in increase of infrared radiation with wave lengths close to near infrared region. Therefore, the use of the present far infrared generator as a heat source, e.g. in place of a magnetron in microwave ranges, permits far infrared radiation heating.

The reasons why such a phenomenon occurs is not yet elucidated theoretically, but the following can be reasoned from the result. When a large amount of microwave energy is applied to the dielectric, its constituents, i.e., molecules, atoms, electrons, or ions are excited into higher energy levels and then returned into the ground state, releasing far infrared rays (electro-magnetic waves) with intrinsic wave lengths. From the fact that the temperature of the dielectric is scarcely increased, it can be assumed that the dielectric itself absorbs almost no microwave energy but converts the microwaves into far infrared rays at high efficiency.

BEST MODE FOR CARRYING OUT THE INVENTION

The present invention is hereinafter described in more detail with reference to the attached drawings.

Figure 1:
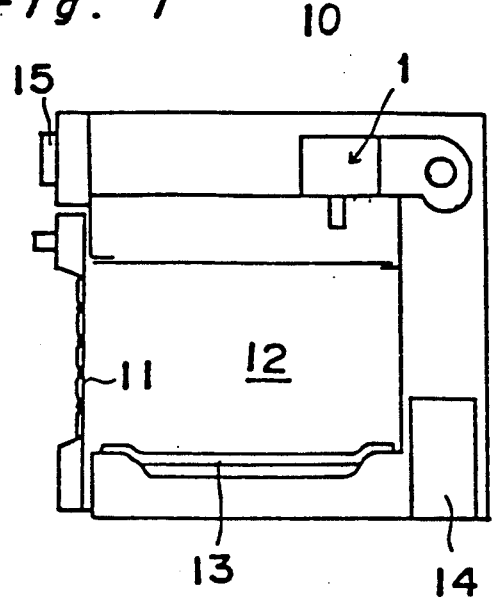
FIG. 1 is a schematic view of a far infrared heating device incorporated with a far infrared generator of the present invention.

FIG. 1 shows a far infrared heating device provided with a far infrared generator 1 of the present invention, which comprises a body 10 made of metal, a door 11 mounted on the body 10 and adapted to be opened or closed as occasion on demand, and a glass table 13 placed on the bottom of a heating chamber 12 in the body 10. The far infrared generator 1 is arranged at the top of the heating chamber 12. The far infrared heating device is provided with a high voltage DC source 14 and a timer 15; the far infrared generator 1 is connected to the high voltage DC source 14 through the timer 15.

Figure 2:
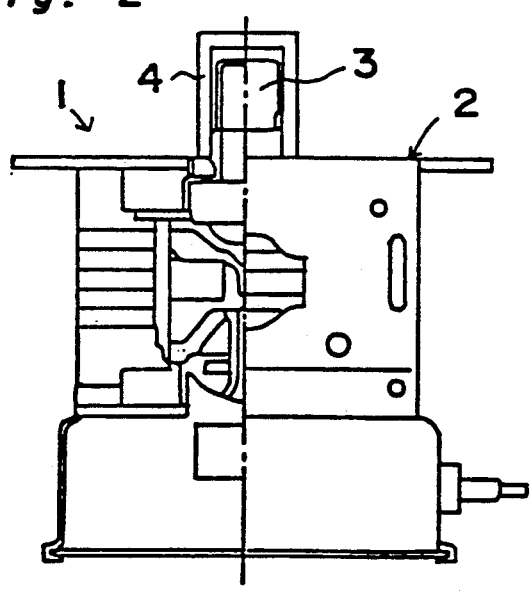
FIG. 2 is a side view of a partial section of the far infrared generator of FIG. 1.

As shown in FIG. 2, the far infrared generator 1 mainly comprises a magnetron 2 and an energy converter 4. The energy converter 4 consists of a dielectric such as a single crystal of magnesium oxide in a cylindrical form with a closed bottom and is fixed to the magnetron 2 so as to cover its output antenna 3.

This far infrared heating device can be operated in the same manner as with microwave ranges, since it has the same structure as that of the microwave ranges, except that the magnetron 2 is provided with the energy converter 4 and it allows the use of the same circuit and controller as those of the microwave ranges.

When using the far infrared heating device, it can be operated simply by opening the door 11, placing the article to be heated, e.g., a food, on the table 13 and setting a desired time with the timer 15. That is, setting the timer 15 initiates supply of a high voltage direct current to the magnetron 2, which in turn oscillates at a given frequency and emits microwaves, which are then converted by the energy converter 4 into far infrared rays, which are radiated in the heating chamber 12.

Accordingly, the present invention makes it possible to obtain a far infrared generator capable of radiating far infrared rays with a desired wave length at high efficiency with simple structure. In addition, heating without spoiling the taste and flavor can be achieved, since far infrared rays do not destroy cell membranes of the article to be heated; also, uniform and quick heating can be achieved, since, unlike microwave heating, uneven heating does not occur.

Figure 3:
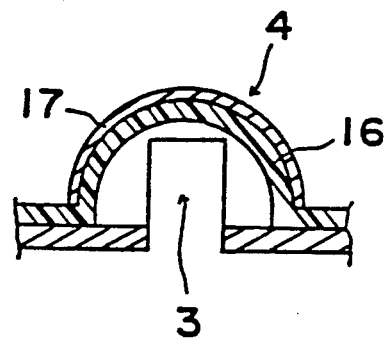
FIG. 3 is a detailed sectional view of a far infrared generator of the present invention in another mode of embodiment.

FIG. 3 shows another mode of embodiment of a far infrared generator of the present invention, in which a dome-shaped energy converter 4 provided with a dielectric layer 17 on the outer surface of a substrate 16 made of glass is screwed to a shield case 8 to make an assembly so that the energy converter 4 covers the output antenna 3 of the magnetron 2. In addition, the energy converter 4 may be mounted on an instrument to which the far infrared generator is applied, e.g., a heater casing itself, instead of mounting directly to the magnetron 2.

Figure 4:
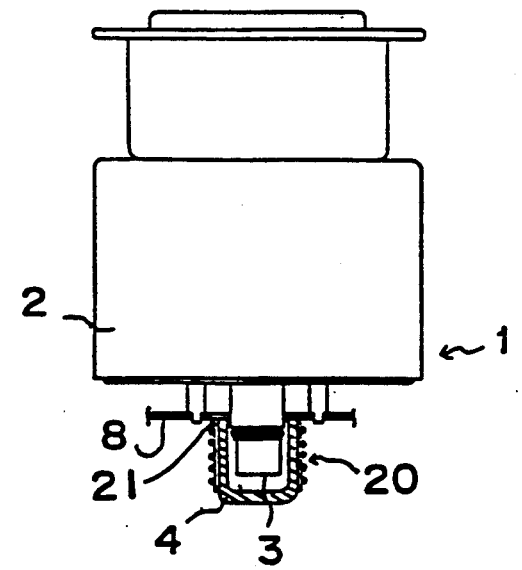
FIG. 4 is a side view of a partial section of a far infrared generator of the present invention in another mode of embodiment.

FIG. 4 shows another mode of embodiment of the present invention, a far infrared heating device 1 having the same structure as that of the device in FIG. 1 except that a temperature controlling unit for controlling the temperature of the energy converter is provided on the periphery of the energy converter 4. The temperature controlling unit comprises a band heater 20 wound around the energy converter 4 and a thermostat 21 attached to the energy converter 4; the temperature control is achieved by detecting the temperature of the energy converter 4 with thermostat 21 and turning on/off the band heater 20.

It is also preferred not to use the thermostat 21 but to control the supply of current to an electric heater on the basis of the difference found using a comparator between the pre-specified reference temperature and the energy converter temperature measured by a contact temperature sensor such as a thermocouple or a thermistor.

Figure 6:
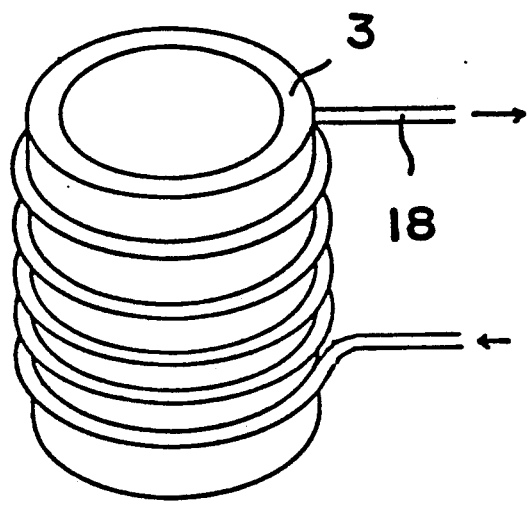
FIG. 6 is a perspective view of an energy converter of the present invention in another mode of embodiment.

The structure of the above-mentioned temperature controlling unit is not limited to the above embodiment, allowing various modifications. For example, as shown in FIG. 6, a coiled pipe 18 may be provided on the periphery of the cylindrical energy converter 4, to which a heating medium or a cooling medium is supplied to heat or cool the energy converter 4.

Figure 7:
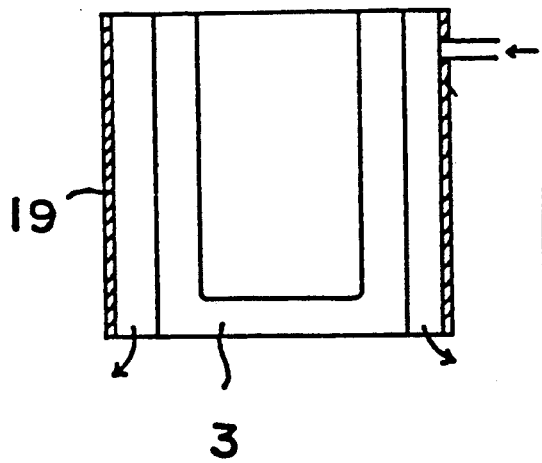
FIG. 7 is a sectional view of an energy converter of the present invention in another mode of embodiment.

Possible, as shown in FIG. 7, to encircle the energy converter 4 with a cylinder 19 so that an empty space to be supplied with a hot or cold air blast by such a blower is formed between the cylinder 19 and the energy converter 4. In this case, the cylinder 19 may be made of a plate of aluminum or other material to add a reflector function.

Figure 8:
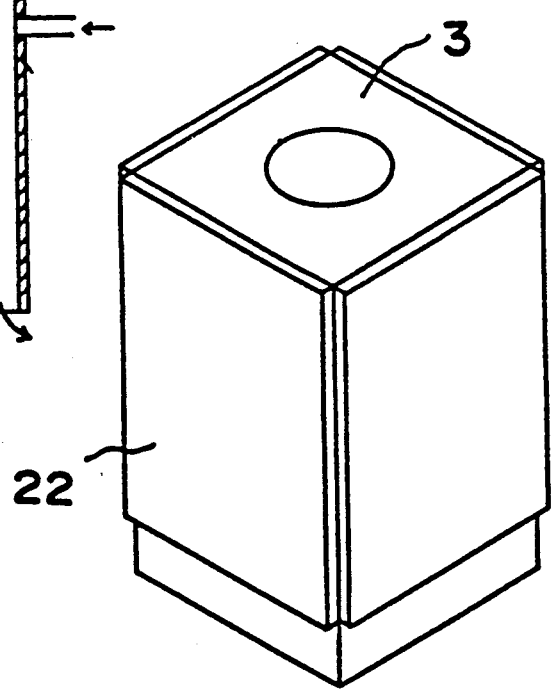
FIG. 8 is a perspective view of an energy converter of the present invention in another mode of embodiment.

Furthermore, as shown in FIG. 8, the use of the prismatic energy converter 4 is acceptable, on each face of which an electronic heating/freezing device 22 based on the Peltier effect is placed.

EXAMPLE 1

A single crystal of magnesium oxide on the market, as the dielectric material, was formed into a cylinder with a closed bottom of 20 mm in outside diameter, 3 mm in thickness, and 60 mm in length so that the energy converter 4 can be gained. The energy converter 4 was mounted on the output antenna 3 of the magnetron 2 of a microwave range on the market with a 600 W high frequency output power to compose the far infrared heating device shown in FIG. 1.

An egg-sized potato (40 g) was placed on the glass table 13 of the far infrared heating device thus composed; the timer 15 was turned on to operate the far infrared generator 1 for a 4-min heating period. The potato baked puffy like a baked sweet potato, and had a sweet taste. Although wrinkling or other deformation did not occur on the potato, spherical charred portions of about 1 cm diameter were formed inside the potato due to the long heating time.

After completion of the heating, the single crystal of magnesium oxide constituting the energy converter 4 was found to have the temperature nearly the same as that of the side walls of the body 10, as evaluated by finger contact, i.e., there was no significant increase in temperature.

The charring and post-heating state of the potato show that heating with the device of the present invention is not microwave heating but near infrared to far infrared radiation heating with relatively long wave lengths. In addition, the fact that no significant temperature rise occurred in the single crystal of magnesium oxide constituting the energy converter 4 proves that the magnesium oxide itself does not become heated but functions as an energy converter which converts microwave energy to far infrared rays.

EXAMPLE 2

A potato was heated under the same conditions as Example 1, but the heating device was provided with synthetic quartz (30 mm in outside diameter, 5 mm in thickness), as the energy converter 4, in place of the single crystal of magnesium oxide. Similar results were obtained.

COMPARATIVE EXAMPLE 1

A potato of the same size as in Example 1 was subjected to microwave heating for 4 minutes in the microwave range used in Example 1. The potato shrank and wrinkled. Taste sampling revealed a grassy taste. No inside charring occurred even when heating time was increased.

EXAMPLE 3

A far infrared heating device with the same constitution as that in Example 1 was made, but cylindrical alumina ceramics (sintered at 1700° C., 99.9% alumina purity) of 20 mm in outside diameter, 2 mm in thickness, and 60 mm in length was used as the material for energy converter 4. A fresh ear of corn weighing 280 g was placed on the glass table 13 of the heating device and heated for 3 minutes, after which it was turned upside down and heated for 2 more minutes. The corn was then seasoned with sugar in soy sauce and again heated in the heating chamber 12 for 1 minute. The corn grains baked puffy; the entire weight became 240 g; taste sampling revealed a very sweet taste.

COMPARATIVE EXAMPLE 2

A fresh ear of corn weighing 300 g was subjected to direct microwave heating in the microwave range used in Example 1. About one third of the corn grains popped: the grain surface became increasingly wrinkled as temperature decreased; the entire weight decreased to 220 g. Taste sampling revealed a poor taste.

The fact that corn weight reduction was smaller than with the microwave range proves that heating with the far infrared heating device according to the present invention is based on far infrared radiation.

EXAMPLE 4

A cylindrical energy converter 4 of 30 mm in outside diameter, 60 mm in length, and 4 mm in thickness was formed using a single crystal of calcium fluoride as the dielectric and mounted on the output antenna of the microwave range used in Example 1 to compose a far infrared heating device. A 300 g grapefruit was cut into hemispheres, one of which was heated for 3 minutes with its cut section being kept in close contact with the glass tube 13. The upper portion of the grapefruit became more heated without cell membranes destruction, thus without fruit juice leakage. Taste sampling revealed a very sweet taste.

EXAMPLE 5

A cylindrical energy converter 4 of 20 mm in diameter, 1 mm in thickness, and 60 mm in length was formed using an electroinsulating mica plate on the market as the dielectric and mounted on the output antenna 3 of the microwave range used in Example 1 to compose the far infrared heating device shown in FIG. 2. This device was used to heat a grapefruit for 3 minutes; the same results as in Example 4 were obtained.

EXAMPLE 6

A cylindrical energy converter 4 of 25 mm in diameter, 1.5 mm in thickness, and 15 mm in length was formed using an artificial quartz as the dielectric and mounted on the output antenna 3 of the microwave range used in Example 1 to compose the far infrared heating device shown in FIG. 2. Heating experimentation used this heating device gave the same results as in Example 4.

COMPARATIVE EXAMPLE 3

For comparison, half a grapefruit was subjected to direct microwave heating for 3 minutes in the microwave range used in Example 1. Cell membranes were destroyed and much fruit juice flew out over the table 13 during heating. After completion of heating, the entire portion of the half grapefruit shrank and deformed. Taste sampling revealed a watery taste lacking sweetness, i.e., the taste was spoiled in comparison to unheated grapefruit.

These findings in the progress of heating and post-heating state of the subject food prove that the far infrared generator of the present invention radiates non-microwave energy, i.e., far infrared rays.

EXAMPLE 7

An energy converter 4 was formed by vapor-depositing lead titanate to a thickness of 3 μm on the surface of a glass tube with a closed bottom of 20 mm in diameter, 1 mm in thickness, and 20 mm in length. This energy converter 4 was mounted on the output antenna of a microwave range (500 W high frequency output power) on the market to compose a far infrared heating device. A sweet potato 4 cm in maximum diameter and 10 cm in length was placed on the glass table and heated for 3 minutes. The sweet potato baked puffy and had a sweet taste.

EXAMPLE 8

A cylindrical energy converter 4 with a closed bottom of 20 mm in outside diameter, 3 mm in thickness, and 60 mm in length was formed using a single crystal of magnesium oxide on the market (produced by Tateho Chemical Industries, Japan, 99.8% purity). The band heater 20 was attached to the periphery of the energy converter 4 to compose the far infrared generator shown in FIG. 4, which was used to compose a far infrared heating device as shown in FIG. 1.

An egg-sized potato (40 g) was placed on the glass table 13 of the far infrared heating device and subjected to heating for 4 minutes while operating the far infrared generator 1 under control with the timer 15 without supplying electric current to the band heater 20. The potato baked puffy like a baked sweet potato, and had a sweet taste. The potato did not shrink or otherwise deform, but some spherical charred portions of an about 1 cm diameter were formed inside the potato due to the long heating time.

After completion of the far infrared radiation heating, the single crystal of magnesium oxide constituting the energy converter 4 was found to have the temperature nearly the same as that of the side walls of the body 10 (about 40° C.), as sensed by finger contact, i.e., there was no significant increase in temperature.

The band heater 20 was then supplied with electric current so that the energy converter 4 was kept at various temperatures, and far infrared radiation heating was conducted. Similar results were obtained.

Figure 5:
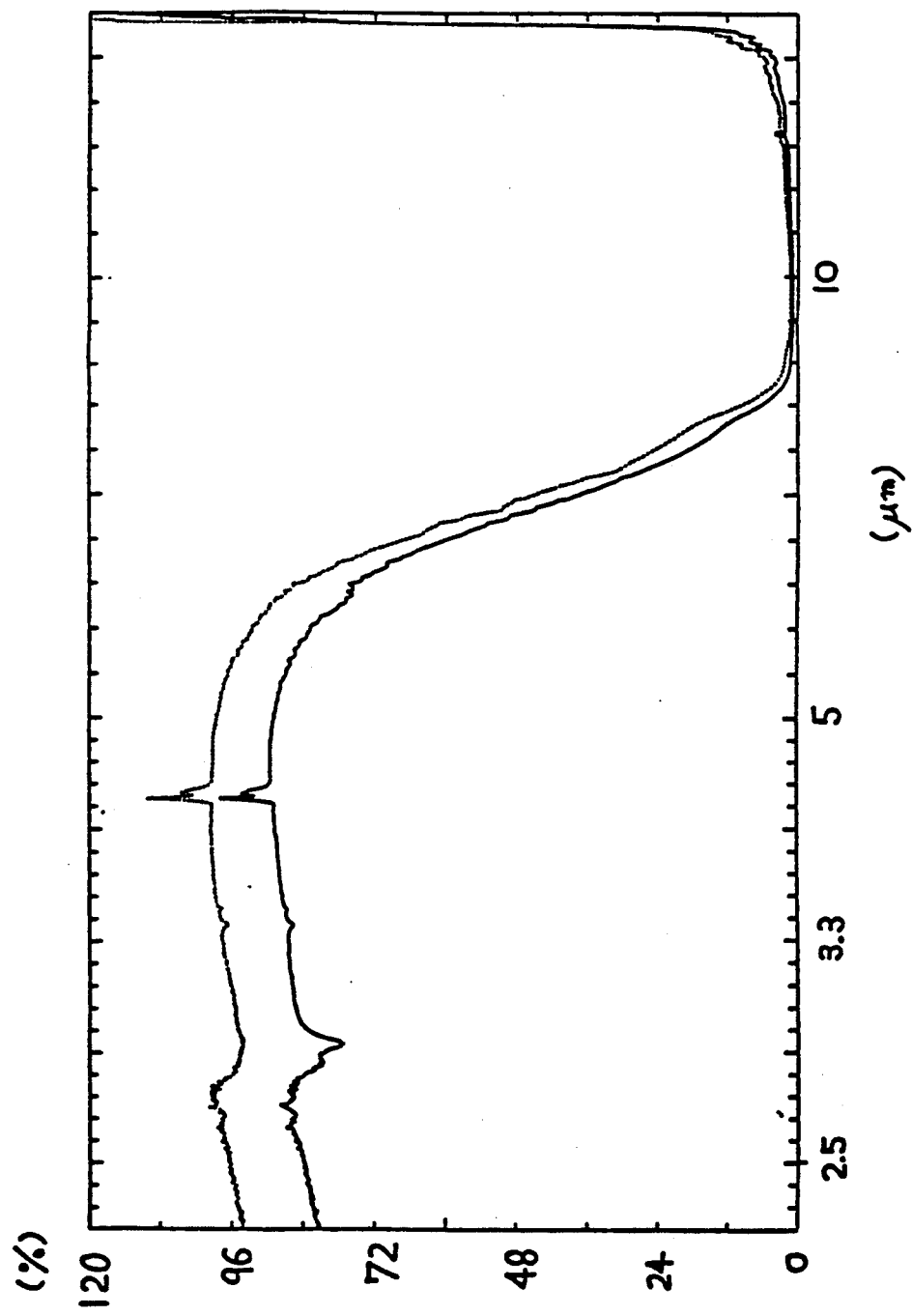
FIG. 5 is a chart showing an example of far infrared radiation spectra of an energy converter material.

The single crystal of magnesium oxide was subjected to far infrared radiation spectrometry at normal (24° C.) temperatures and 68° C. The results shown in FIG. 5 were obtained. In FIG. 5, the dotted line shows the results obtained at 24° C., and the solid line shows the results obtained at 68° C.

As is evident from FIG. 5, the emissivity characteristic of a single crystal of magnesium oxide fluctuates rather widely, while ordinary far infrared radiating materials have a nearly constant value of emissivity independent of temperature; the emissivity of a single crystal of magnesium oxide decreases as temperature increases within the wave length range of below 6 μm. This suggests that it is preferred to keep a single crystal of magnesium oxide at a low temperature.

Also, 100 g of dry ice and 100 g of ice in separate containers were placed in the heating chamber 12 and heated for 2 minutes without supplying electric current to the band heater 20. The ice melted entirely to water at 45° C., and the dry ice decreased in weight to 70 g.

Since dry ice is not sublimed by microwaves, the weight reduction of the dry ice proves that the beating device according to the present invention radiates far infrared rays.

Heating experiments were conducted respectively using alumina ceramics (99.9% purity, sintered at 1700° C.), a single crystal of calcium fluoride on the market, an electroinsulating mica plate, and an artificial quartz, as materials for the dielectric to comprise the energy converter. Similar results were obtained.

COMPARATIVE EXAMPLE 4

Using the above-mentioned microwave range on the market, a potato of the same size as that in Example 8 was microwave heated for 4 minutes. The potato shrank and wrinkled as its temperature decreased. Taste sampling revealed an undercooked taste. Potato charring did not occur even when heating time was increased.

Also, 100 g of dry ice and 100 g of ice in separate containers were heated in the microwave range as above for 2 minutes. The ice melted entirely to water at 48° C.; while the dry ice remained almost intact, its weight decreased to 95 g.

EXAMPLE 9

An energy converter 4 was formed by vapor-depositing lead titanate to a 3 μm thickness on the surface of a flat-bottomed cylinder of a glass of 20 mm in diameter, 1 mm in thickness, and 60 mm in length. The cylinder was mounted on the output antenna of a microwave range having structure similar to that shown in FIG. 2 to compose a far infrared radiation heating device. A sweet potato of 4 cm in maximum diameter and 10 cm in length was placed on the glass table for 3 minutes. The sweet potato baked puffy and had a sweet taste.

INDUSTRIAL APPLICABILITY

As is evident from the above description, the far infrared generator of the present invention is capable of radiating far infrared rays with a desired wave length at high efficiency with simple structure without destroying cell membranes of the heated article or causing uneven heating, thus permitting quick cooking; therefore, it can be used as a heat source for cooking appliances for commercial and household use.

What is claimed is:

1. A far infrared generator comprising a means for generating microwaves and an energy converter for converting the microwaves radiated from said microwave generating means through an output portion directly into far infrared rays by absorbing almost no microwave energy and without generating heat, which converter consists essentially of a dielectric made of one material selected from the group consisting of mica and single crystals of oxides and fluorides of magnesium, calcium, zirconium, silicon, aluminum and titanium, said dielectric being formed in a shape surrounding the output portion of said microwave generator.

2. A far infrared generator as claimed in claim (1) wherein said energy converter consists of a dielectric and a substrate for supporting said dielectric, said substrate being of an electromagnetic wave transmitting material.

3. A far infrared generator as claimed in claim (1) wherein said energy converter is in the shape of a dome.

4. A far infrared generator as claimed in claim (1) wherein said energy converter is in the shape of a cylinder with a closed bottom.

5. A far infrared generator as claimed in claim (1) wherein said dielectric is of a single crystal selected from the group consisting of crystals of magnesium oxide, zirconium oxide, silicon oxide, rock crystal, sapphire and ruby.

6. A far infrared generator as claimed in claim (1) wherein said energy converter is provided with a means for controlling its temperature to control wave length of radiated far infrared rays.

7. A far infrared generator as claimed in claim (6) wherein said temperature controlling means is an electric heater.

8. A far infrared generator as claimed in claim (6) wherein said temperature controlling means comprises a pipe wound like a coil around said energy converter and a means for supplying a heat transfer medium to one end of said pipe and cooling or heating the heat transfer medium running out the other end of said pipe, said heat transfer medium being circulated through said pipe by said heat transfer medium supplying means.

9. A far infrared generator as claimed in claim (6) wherein said temperature controlling means comprises a heat source for heating or cooling gas and a blower for blowing gas to said energy converter.

10. A far infrared generator as claimed in claim (1) wherein said dielectric is of single crystal of aluminum fluoride or magnesium fluoride.

11. A far infrared generator as claimed in claim (1) wherein said dielectric is of a mica.

* * * * *